(12) United States Patent
Tschanz et al.

(10) Patent No.: US 7,653,850 B2
(45) Date of Patent: Jan. 26, 2010

(54) DELAY FAULT DETECTION USING LATCH WITH ERROR SAMPLING

(75) Inventors: James W. Tschanz, Portland, OR (US); Keith A. Bowman, Hillsboro, OR (US); Nam Sung Kim, Portland, OR (US); Chris Wilkerson, Portland, OR (US); Shih-Lien L. Lu, Portland, OR (US); Tanay Karnik, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 307 days.

(21) Appl. No.: 11/758,124

(22) Filed: Jun. 5, 2007

(65) Prior Publication Data

US 2008/0307277 A1    Dec. 11, 2008

(51) Int. Cl.
*G01R 31/28* (2006.01)
*G06K 5/04* (2006.01)
(52) U.S. Cl. ...................... 714/726; 714/699
(58) Field of Classification Search ............... 714/724, 714/726, 733, 734, 73, 736, 819, 30, 699, 714/48
See application file for complete search history.

(56) References Cited

U.S. PATENT DOCUMENTS

| | | | | |
|---|---|---|---|---|
| 7,188,284 | B2 * | 3/2007 | Mitra et al. | 714/726 |
| 7,278,074 | B2 * | 10/2007 | Mitra et al. | 714/724 |
| 7,278,076 | B2 * | 10/2007 | Zhang et al. | 714/726 |
| 7,373,572 | B2 * | 5/2008 | Mak et al. | 714/729 |
| 7,523,371 | B2 * | 4/2009 | Mitra et al. | 714/729 |

OTHER PUBLICATIONS

Dan Ernst et al., "Razor: Circuit-Level Correction of Timing Errors for Low-Power Operation", IEEE Computer Society, Nov.-Dec. 2004, IEEE Micro, 0272-1732. pp. 10-20.
Shidhartha Das et al., "A Self-Tuning DVS Processor Using Delay-Error Detection and Corrrection", IEEE Journal of Solid-State Circuits, vol. 41, No. 4, Apr. 2006, 0018-9200. pp. 792-804.
Tschanz, James W. et al., U.S. Appl. No. 11/323,675, entitled "Error-Detection Flip-Flop" filed Dec. 30, 2005.

* cited by examiner

*Primary Examiner*—Phung M Chung
(74) *Attorney, Agent, or Firm*—Buckley, Maschoff & Talwalkar LLC

(57) ABSTRACT

Some embodiments provide sampling of a data signal output from a path stage using a latch, sampling of the data signal output from the path stage using an edge-triggered flip-flop, comparing a first value output by the latch with a second value output by the edge-triggered flip-flop, and generating an error signal if the first value is different from the second value.

10 Claims, 3 Drawing Sheets

DELAY FAULT DETECTION USING LATCH WITH ERROR SAMPLING

BACKGROUND

Error-detection and error-recovery features may improve the reliability of conventional microprocessors. However, these features are typically designed to catch permanent faults, such as stuck-at-faults and electromigration issues, or soft errors which are caused by cosmic rays. Delay faults, on the other hand, typically require performance and power guardbands for governing microprocessor operation. Error-detection and error-recovery features designed to address delay faults may therefore allow for significantly less-restrictive guardbands.

Specialized circuits for detecting delay faults may be placed in the critical paths of a microprocessor. The "Razor" technique, for example, samples the path data on the rising clock edge and on the falling edge to detect late-arriving data. More particularly, the Razor technique samples the incoming data on the rising clock edge using a standard datapath flip-flop, and samples the data again on the falling clock edge using a shadow latch. If the samples are different, a delay error has occurred, the pipeline is flushed and the instruction is repeated. This technique allows a microprocessor to run at a frequency very close to its maximum frequency. See "Razor: A Low Power Pipeline Based on Circuit-level Timing Speculation", MICRO-36, December 2003.

However, operating the microprocessor at its maximum frequency may cause the datapath flip-flops to become metastable. Metastable datapath flip-flops may in turn cause an error which will not be detected by the double sampling. These undetected errors are unacceptable. Addressing such errors via a metastability detector or a metastable-hardened flip-flop is prohibitively expensive in terms of area and power.

DETAILED DESCRIPTION

In the following description, particular circuit configurations, logic gates, latches, flip-flops and signals are described for purpose of illustration. Some embodiments are compatible with other circuit configurations, logic gates, latches, flip-flops and signals.

Figure 1:
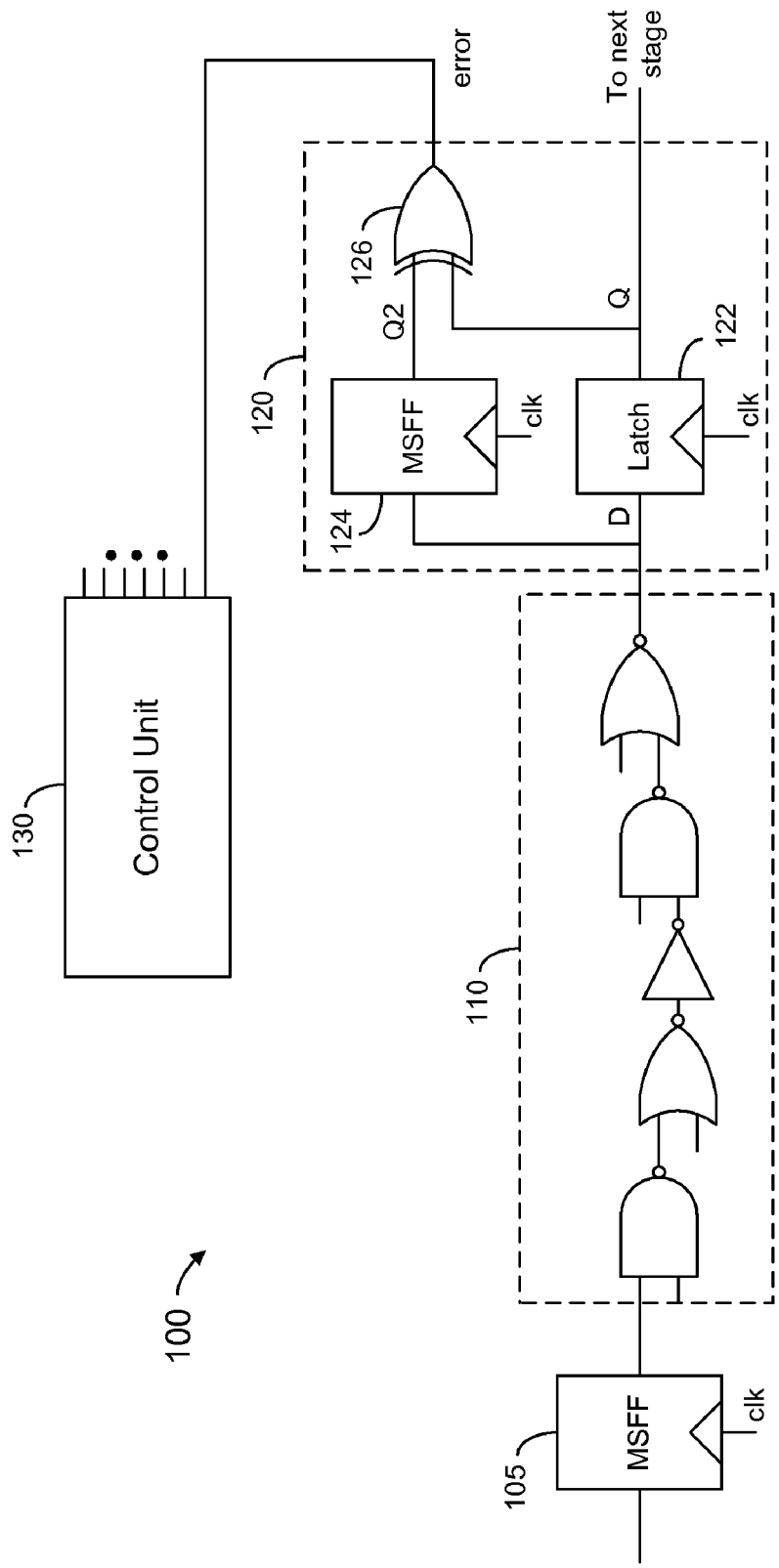
FIG. 1 a logic diagram of a system according to some embodiments.

FIG. 1 is a schematic diagram of system 100 according to some embodiments. System 100 may determine delay faults, and may also provide for correction of thusly-determined delay faults. System 100 may comprise elements of a microprocessor, but embodiments are not limited thereto.

System 100 includes clocked master-slave flip-flop (MSFF) 105, critical path stage 110, error-detecting circuit 120, and control unit 130. MSFF 105 may comprise any suitable sequential element such as any edge-triggered flip-flop, and may follow a prior (unshown) pipeline stage. Critical path stage 110 may comprise any currently- or hereafter-known collection of combinatorial logic. Stage 110 is deemed "critical" because an operational frequency of a device (e.g., a microprocessor) including system 100 is limited by a propagation delay attributable to stage 110. In a case that a critical path stage precedes MSFF 105, MSFF 105 may comprise an error-detecting latch such as described below. Some embodiments may be implemented with respect to datapath stages that are not deemed "critical".

Error-detecting circuit 120 includes latch 122, MSFF 124 and comparator 126, which is depicted as an XOR gate in FIG. 1. As shown, an input of latch 122 is coupled to an output of stage 110. Latch 122 therefore receives a signal D from critical path stage 110 and outputs a value Q based on signal D and on a received clock signal clk. In other words, the value Q corresponds to a sampled value of signal D. The output of latch 122 is coupled to a next critical path stage in some embodiments.

An input of MSFF 124 is also coupled to an output of stage 110 to receive signal D therefrom. MSFF 124 samples signal D and outputs a corresponding sampled value Q2 in response to a detected edge of clock signal clk. MSFF 124 may comprise a minimum-sized flip-flop in some embodiments.

Comparator 126 is coupled to the output of latch 122 and to the output of MSFF 124. Comparator 126 therefore compares value Q with the value Q2. In some embodiments, comparator 126 generates an error signal if Q is different from Q2. The existence of a difference between Q and Q2 is an indication that a delay fault error has occurred within critical path stage 110.

Since a latch exhibits an input-to-output delay that is shorter than a flip-flop's input-to-output delay, the overall datapath is faster than the aforementioned Razor technique in some embodiments. Some embodiments also consume less power than conventional techniques, because the datapath sequential used in such techniques is typically sized larger than latch 122 or MSFF 124.

Some embodiments also address the metastability issue mentioned above. Specifically, latch 122 will sample the data correctly even if the data arrives at the same time or slightly later than the rising edge of the clock, since latch 122 is transparent for the whole high phase of the clock. That is, signal D passes through latch 122 with a minimal delay whenever the clock is high. In a worst case, MSFF 124 may become metastable and will cause comparator 126 to generate an error signal even though no delay fault has occurred (i.e., a false positive). However, according to some embodiments, error-detecting circuit 120 will always output an error signal if a delay fault has occurred. Because the rate of false positives is by necessity low (due to operation at peak performance), the performance impact of responding to an infrequent false positive may be negligible.

Control unit 130 is to receive an error signal from circuit 120, to determine an instruction associated with the error signal, and to cause re-execution of the instruction. Control unit 130 may also operate to change an operational parameter (e.g., supply voltage, frequency) of the circuit based on the error signal. Control unit 130 may be configured to receive error signals output by other unshown error-detecting circuits which follow respective critical path stages.

Figure 2:
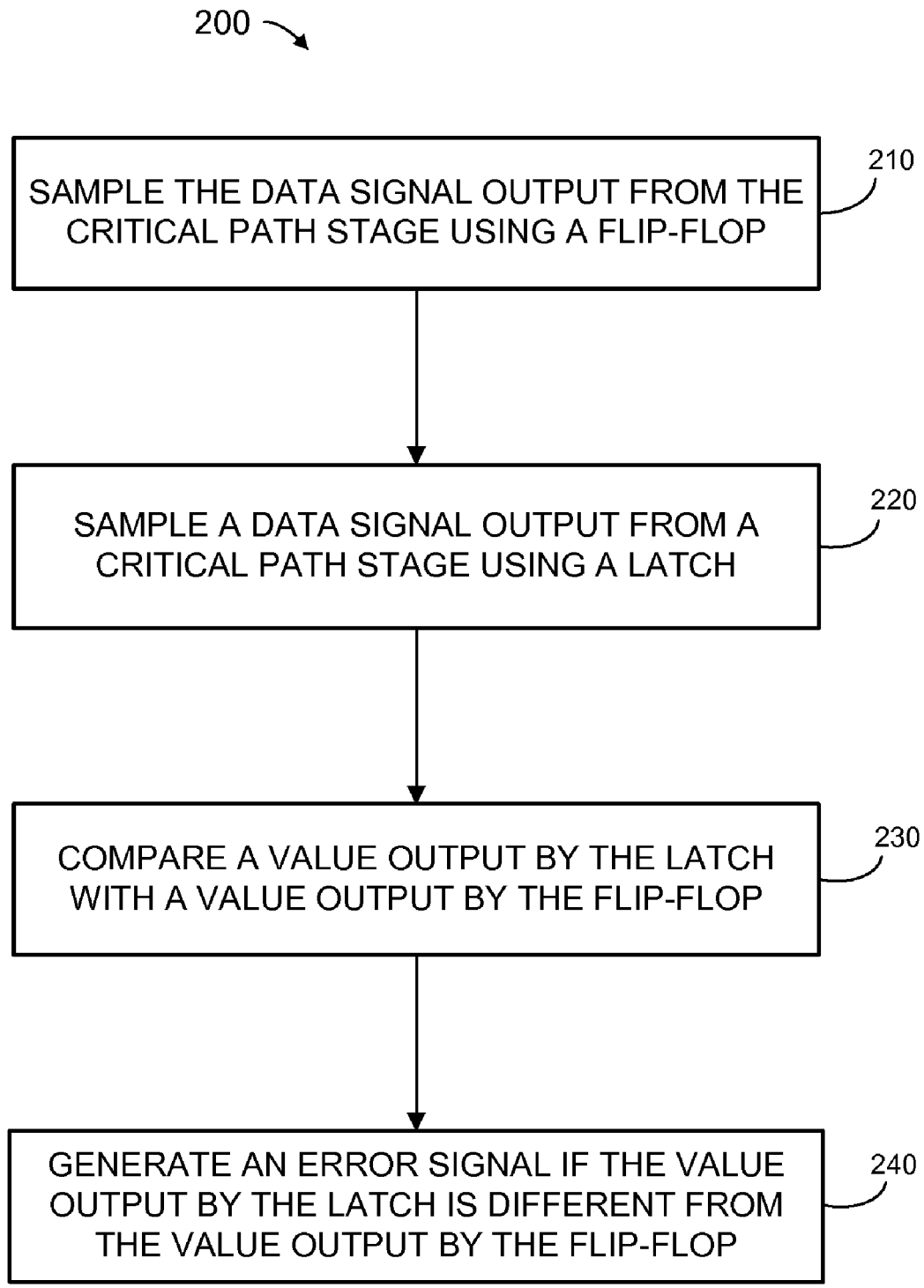
FIG. 2 is a flow diagram of a process according to some embodiments.

FIG. 2 is a flow diagram of process 200 according to some embodiments. Process 200 may be performed by any combination of hardware, firmware, and/or software, and some or all of process 200 may be performed manually. Examples of process 200 will be described below in conjunction with system 100, but embodiments are not limited thereto.

Figure 3:
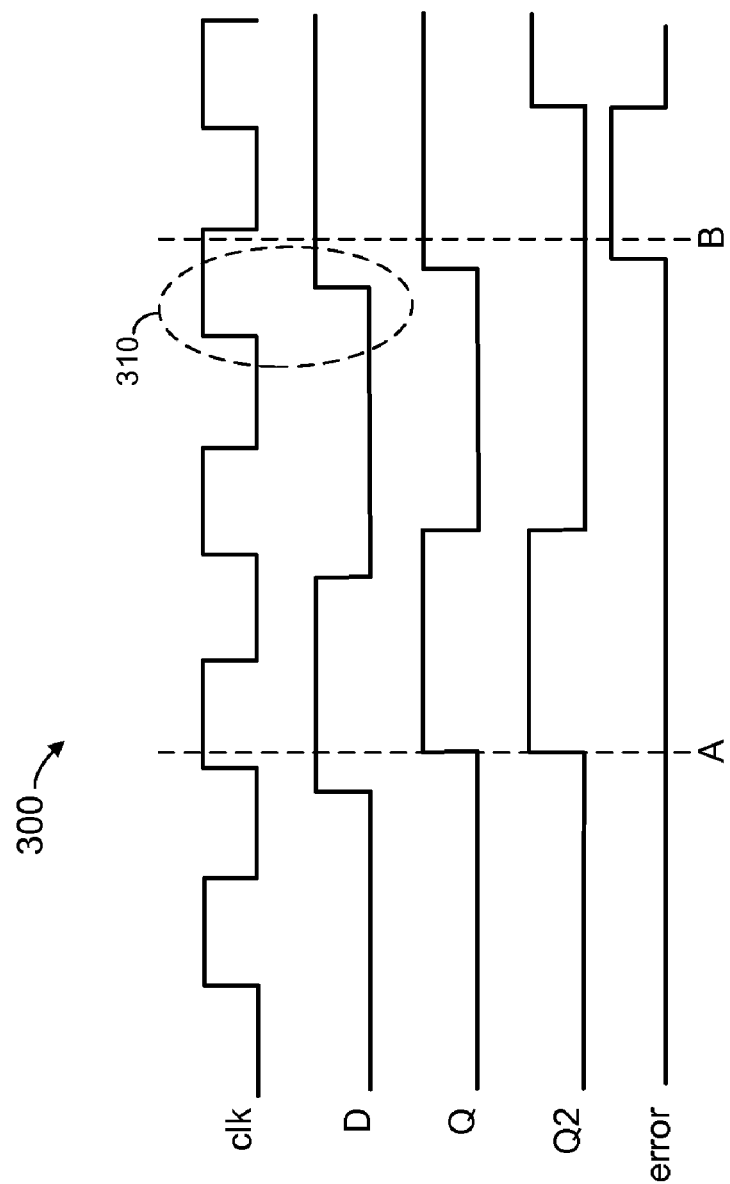
FIG. 3 is timing diagram according to some embodiments.

A data signal output from a critical path stage is sampled using a flip-flop at 210. In one example of 210, MSFF 124 receives data signal D from critical path stage 110 and samples data signal D based on clock signal clk. FIG. 3 shows timing diagram 300 including signals D, Q, Q2, and error according to some embodiments. As shown, value Q2 comprises a sample of signal D taken by MSFF 124 at time A in response to a rising edge of signal clk.

Next, at 220, the data signal output from a critical path stage is sampled using a latch. Latch 122, for example, may receive data signal D from critical path stage 110 and sample data signal D based on clock signal clk. Latch 122 outputs value Q as a result of the sampling. Timing diagram 300 shows value Q output by latch 122 at time A as a result of such sampling.

A value output by the latch is compared with a value output by the flip-flop at 230. Comparator 126 may compares value Q with value Q2 in some embodiments of 230. Next, at 240, an error signal is generated if the value output by the latch is different from the value output by the flip-flop. Values Q and Q2, as sampled at time A of timing diagram 300, are equal and therefore the error signal is low (i.e., inactive).

At time B, however, values Q and Q2 differ from one another. The delay fault which has caused values Q and Q2 to differ is illustrated in area 310 of FIG. 3. Specifically, the data of signal D has arrived after the rising edge of clock clk. Proper timing of critical path stage 110 requires the data of signal D to be present for sampling at a rising edge of clock clk. Since the data of signal D is not present for sampling at the rising edge, only value Q reflects signal D due to the operation of latch 122. Q2 remains low (i.e., until a next rising edge), so comparator 126 generates (i.e., activates) the error signal.

The several embodiments described herein are solely for the purpose of illustration. Other embodiments may use any combination of hardware, software, and logic gates to implement the processes described herein. Therefore, persons in the art will recognize from this description that other embodiments may be practiced with various modifications and alterations.

What is claimed is:

1. A circuit comprising:
    a path stage comprising combinatorial logic and a first output; and
    an error-detecting circuit comprising:
        a latch comprising a first input coupled to the first output, and a second output coupled to a next path stage;
        an edge-triggered flip-flop comprising a second input coupled to the first output, and a third output; and
        a comparator coupled to the second output and the third output, the comparator to compare a first value output by the latch with a second value output by the edge-triggered flip-flop.

2. A circuit according to claim 1, wherein the latch is to receive a signal from the path stage and to output the first value based on the signal, and
    wherein the edge-triggered flip-flop is to receive the signal from the path stage and to output the second value based on the signal.

3. A circuit according to claim 1, wherein the comparator comprises an XOR gate.

4. A circuit according to claim 1, wherein the comparator is to generate an error signal if the first value is different from the second value.

5. A circuit according to claim 4, further comprising a control unit to receive the error signal, to determine an instruction associated with the error signal, and to cause re-execution of the instruction.

6. A circuit according to claim 5, wherein the control unit is to change an operational parameter of the circuit based on the error signal.

7. A circuit according to claim 1, wherein the path stage comprises a critical path stage.

8. A method comprising:
    sampling a data signal output from a path stage using an edge-triggered flip-flop;
    Sampling a data signal output from the path stage using a latch;
    comparing a first value output by the latch to a next path stage with a second value output by the edge-triggered flip-flop;
    generating an error signal if the first value is different from the second value; and
    receiving the error signal;
    determining an instruction associated with the error signal; and
    causing re-execution of the instruction.

9. A method according to claim 8, further comprising:
    Changing an operational parameter of the path stage based on the error signal.

10. A method according to claim 8, wherein the path stage comprises a critical path stage.

* * * * *